US008550758B2

(12) United States Patent
Kanczuzewski et al.

(10) Patent No.: US 8,550,758 B2
(45) Date of Patent: Oct. 8, 2013

(54) DEVICE AND METHOD FOR RESTRAINING CARGO

(75) Inventors: Thomas E. Kanczuzewski, South Bend, IN (US); Ashley Brickley, legal representative, South Bend, IN (US); John W. Doster, Granger, IN (US); John E. Townsend, Paw Paw, MI (US); Donald J. Nagy, South Bend, IN (US); James Doster, Granger, IN (US)

(73) Assignee: Logistick, Inc., South Bend, IN (US)

( * ) Notice: Subject to any disclaimer, the term of this patent is extended or adjusted under 35 U.S.C. 154(b) by 0 days.

(21) Appl. No.: 13/436,483

(22) Filed: Mar. 30, 2012

(65) Prior Publication Data

US 2012/0195706 A1 Aug. 2, 2012

Related U.S. Application Data

(63) Continuation-in-part of application No. 12/948,529, filed on Nov. 17, 2010, now Pat. No. 8,192,121.

(51) Int. Cl.
 *B61D 45/00* (2006.01)
 *B60P 7/15* (2006.01)
(52) U.S. Cl.
 USPC .................. 410/152; 410/143; 410/151
(58) Field of Classification Search
 USPC ......... 410/152, 151, 143, 89, 46, 90, 91, 129, 410/144; 248/347, 205.3, 214, 222.51, 248/222.12, 222.13
 See application file for complete search history.

(56) References Cited

U.S. PATENT DOCUMENTS

| 969,002 A | 8/1910 | Teachout |
|---|---|---|
| 1,401,419 A | 12/1921 | Mcnally |
| 1,951,660 A | 3/1934 | Klaudt |
| 2,124,082 A | 7/1938 | Reifer |
| 2,414,160 A | 1/1947 | Moon |
| 2,464,080 A | 3/1949 | Hankins |
| 2,467,681 A | 4/1949 | McKinney |
| 2,468,101 A | 4/1949 | Nampa |
| 2,697,631 A | 12/1954 | Miller |
| 2,752,864 A | 7/1956 | McDougal, Sr. et al. |
| 2,766,704 A | 10/1956 | McMahon |
| 2,845,245 A | 5/1958 | Gray et al. |
| 2,912,939 A | 11/1959 | Miner, Jr. et al. |
| 2,980,037 A | 4/1961 | Elsner |
| 2,993,708 A | 7/1961 | Holman, Jr. |
| 3,177,007 A | 4/1965 | Oren |
| 3,344,750 A | 10/1967 | Kostrewa |
| 3,559,591 A | 2/1971 | Breen et al. |
| 3,590,746 A | 7/1971 | Gibson |
| 3,712,663 A | 1/1973 | Laven |
| 3,836,174 A | 9/1974 | Holman, Jr. |
| 3,995,565 A | 12/1976 | Kersey |
| 4,026,508 A | 5/1977 | Ziegler |
| 4,080,906 A | 3/1978 | Brown |

(Continued)

FOREIGN PATENT DOCUMENTS

GB 1209255 10/1970

*Primary Examiner* — Glenn Dayoan
*Assistant Examiner* — Sunsurraye Westbrook
(74) *Attorney, Agent, or Firm* — Barnes & Thornburg LLP

(57) ABSTRACT

A stackable device for engaging an elongated support for restraining cargo in a container having a pair of opposed walls and configured to transfer to shear stress at least some of the tensile force applied by the elongated support. The stackable device invertably stackable with an other stackable device.

18 Claims, 4 Drawing Sheets

(56) References Cited

U.S. PATENT DOCUMENTS

| | | |
|---|---|---|
| 4,264,251 A | 4/1981 | Blatt |
| 4,278,376 A | 7/1981 | Hunter |
| 4,396,325 A | 8/1983 | Joice-Cavanagh |
| 4,432,678 A | 2/1984 | Liebel |
| 4,498,824 A | 2/1985 | Kinkle |
| 4,616,757 A | 10/1986 | Hobson |
| 4,700,918 A | 10/1987 | Andrasko, Jr. |
| D294,340 S | 2/1988 | Robson |
| 4,735,468 A | 4/1988 | Taylor, Jr. et al. |
| 4,756,498 A | 7/1988 | Frye |
| 4,830,558 A | 5/1989 | Sweeney |
| 4,846,610 A | 7/1989 | Schoenleben |
| 4,880,342 A | 11/1989 | Pradovic |
| 4,932,817 A | 6/1990 | Mattare |
| 4,955,771 A | 9/1990 | Bott |
| 4,962,907 A | 10/1990 | Gary |
| 4,982,922 A | 1/1991 | Krause |
| 5,028,184 A | 7/1991 | Krause |
| 5,156,110 A | 10/1992 | Fuller |
| 5,169,007 A | 12/1992 | McHendry |
| 5,219,251 A | 6/1993 | Kanczuzewski |
| 5,259,712 A | 11/1993 | Wayne |
| 5,281,063 A | 1/1994 | Austin, III |
| D344,482 S | 2/1994 | Arvidsson |
| 5,320,464 A | 6/1994 | Long et al. |
| 5,326,204 A | 7/1994 | Carlson et al. |
| 5,362,184 A * | 11/1994 | Hull et al. ...................... 410/90 |
| 5,370,482 A | 12/1994 | Long |
| 5,494,389 A | 2/1996 | Kanczuzewski |
| D382,533 S | 8/1997 | Okland |
| 5,688,087 A | 11/1997 | Stapleton et al. |
| 5,807,047 A * | 9/1998 | Cox ............................ 410/152 |
| D406,095 S | 2/1999 | Denny et al. |
| D422,554 S | 4/2000 | Stapleton et al. |
| 6,086,299 A * | 7/2000 | Kanczuzewski .............. 410/152 |
| D438,022 S | 2/2001 | Bunn |
| D453,869 S | 2/2002 | Schultz et al. |
| D458,210 S | 6/2002 | Kanczuzewski et al. |
| 6,533,513 B2 | 3/2003 | Kanczuzewski et al. |
| D478,857 S * | 8/2003 | Petersen et al. .............. D12/223 |
| 6,607,338 B2 * | 8/2003 | Lemke ......................... 410/151 |
| 6,874,982 B2 | 4/2005 | Rhodes |
| D506,076 S | 6/2005 | Weisgerber |
| D537,405 S | 2/2007 | Saward |
| D571,279 S | 6/2008 | Trusty et al. |
| D589,709 S | 4/2009 | Edwards |
| 2010/0308091 A1 | 12/2010 | Hubbard |

* cited by examiner

DEVICE AND METHOD FOR RESTRAINING CARGO

CROSS REFERENCE TO RELATED APPLICATIONS

This Application is a Continuation-in-Part of copending U.S. patent application Ser. No. 12/948,529, filed Nov. 17, 2010, the contents of which application is herein incorporated by reference in its entirety.

The present disclosure relates generally to a device and method for restraining cargo within a container.

BACKGROUND

Cargo transported for commercial and other uses is often shipped in semi-trailers or other trucks, railcars, ships, aircraft or other shipping vehicles. In most instances, shifting or translation of cargo within the shipping vehicle can occur during shipping which can lead to damage. U.S. Pat. Nos. 6,533,513, 6,086,299 and 5,494,389, disclose cargo retention devices that have been well received in the shipping industry. A pair of such cargo retention devices may be secured on opposed walls of the shipping vehicle, and an elongated support in the form of a wood beam or the like is positioned across the bed of the shipping vehicle and engaged with the cargo retention devices to secure cargo.

SUMMARY

The present disclosure is directed to a device for engaging a 2×4 or other wooden beam or elongated support for restraining cargo in a container having a pair of opposed walls and configured to transfer to shear stress at least some of the tensile force applied by the elongated support. The device is invertably stackable with an other device. The device comprises: a strip having a bottom strip surface with an adhesive disposed thereon for securing the stackable device to one of the walls of the container, and a top strip surface, the strip having a pair of ends; a sleeve including a plurality of walls extending from the top strip surface generally perpendicular to the top strip surface defining a cavity having an open end for receiving an end of the elongated support; and a lip on the top strip surface between one of the ends of the strip and the sleeve; wherein during stacking the cavity receives a lip of the other stackable device and the lip of the stackable device is configured to be received by a cavity of the other stackable device.

The device may also include a pair of gussets disposed about the lip, the lip and the pair of gussets defining a holder, wherein during stacking the holder receives a sleeve of the other stackable device and the sleeve of the stackable device is configured to be received by a holder of the other stackable device. A handle may be disposed at one of the ends of the strip, the handle further defining the holder. The handle has an inner wall further defining the holder.

The handle may have a top handle surface and, when the stackable device is secured to said one of the walls of the container, the top handle surface and the top strip surface are generally parallel to said one of the walls and a distance from said one of the walls of the container to the top handle surface is greater than the distance from said one of the walls of the container to the top strip surface. The stackable device may further include: a plurality of other gussets extending from the sleeve toward said one of the ends of the strip and being generally parallel to each other; and a gusset wall extending generally perpendicular to the other gussets, the gusset wall positioned between the sleeve and said one of the ends, the other gussets terminating in the gusset wall, the gusset wall further defining the holder; wherein the plurality of gussets extend from the gusset wall toward said one end of the strip. The other gussets may define a distance therebetween. The gusset wall may have a length greater than the distance between the other gussets. The second gussets define a distance therebetween, and the distance between the second gussets may be greater than the distance between the first gussets. The lip and the gusset wall may define a first gap within the holder and during stacking the first gap receives one of the walls of the sleeve of other stackable device. Additionally, the lip and the gussets may define second gaps within the holder and during stacking each second gap receives a respective one of the other walls of the sleeve of the other stackable device.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

DETAILED DESCRIPTION

Figure 1:
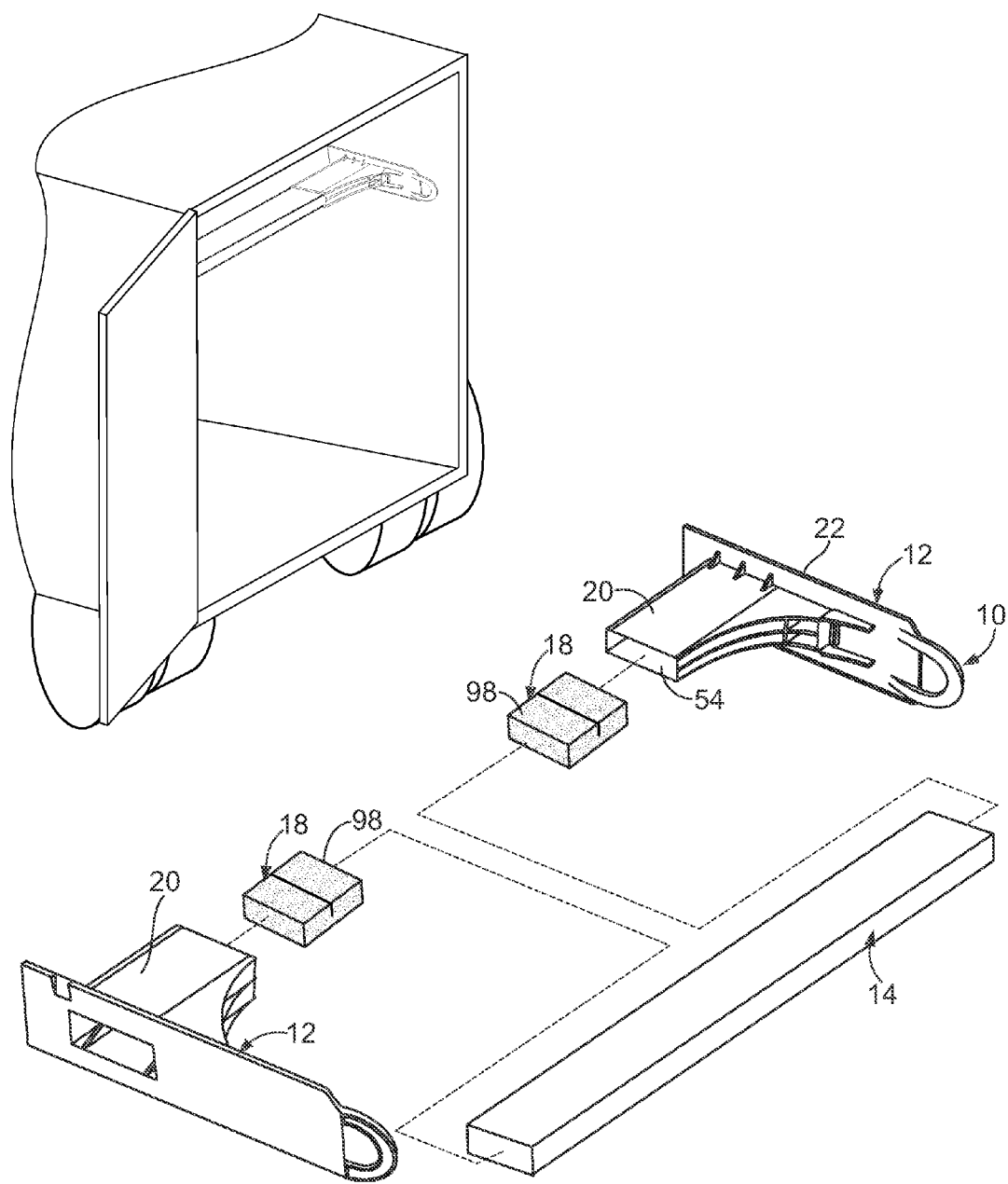
FIG. 1 is a partial view of a semi-trailer and a cargo restraint assembly in accordance with an illustrated embodiment of the present disclosure being used to restrain cargo in the semi-trailer, including an exploded view of the cargo restraint assembly.
Figure 2:
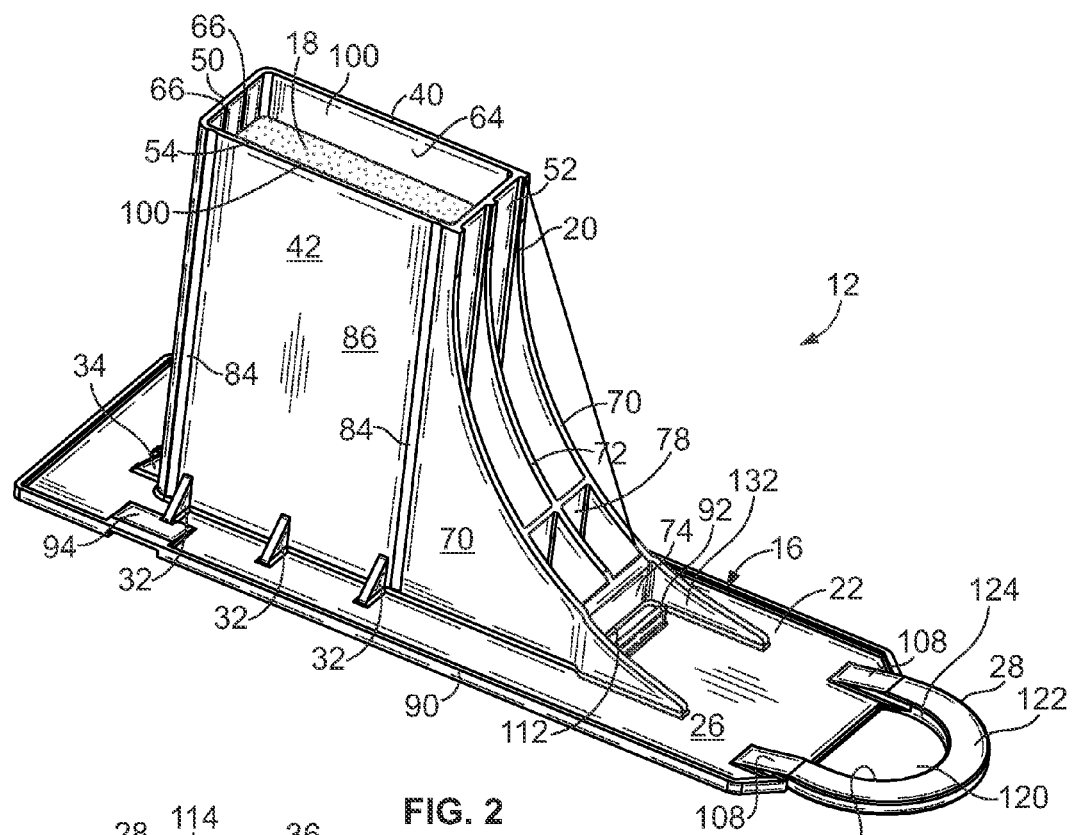
FIG. 2 is a top perspective view of one of the cargo restraint devices of FIG. 1.
Figure 3:
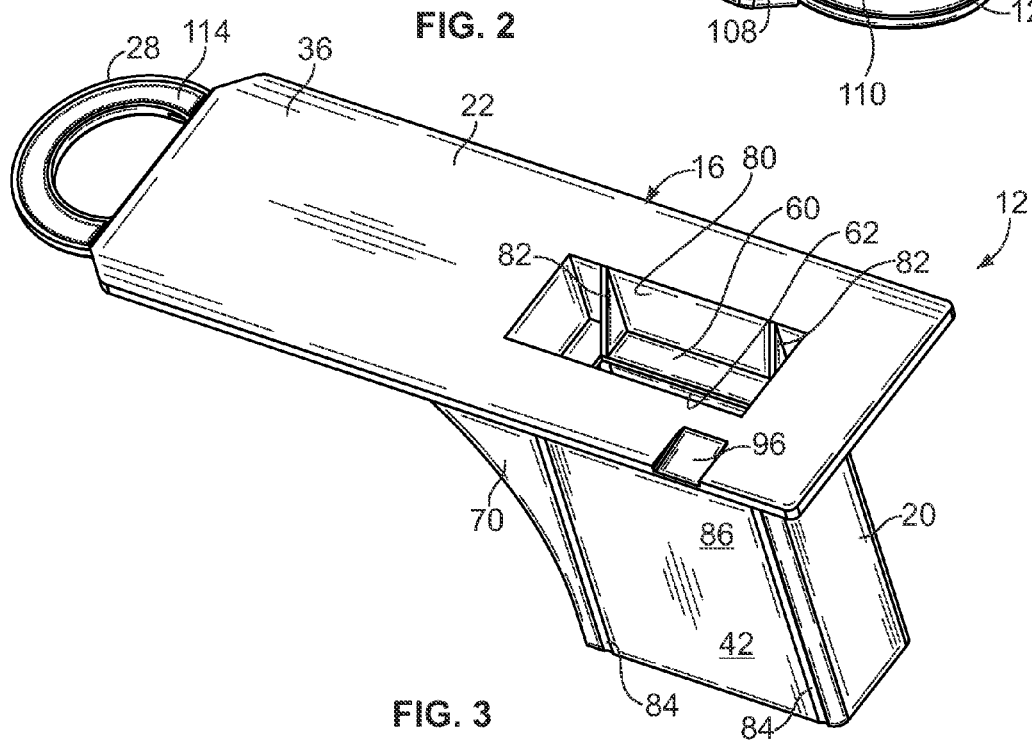
FIG. 3 is a bottom perspective view of the cargo restraint device of FIG. 2.
Figure 4:
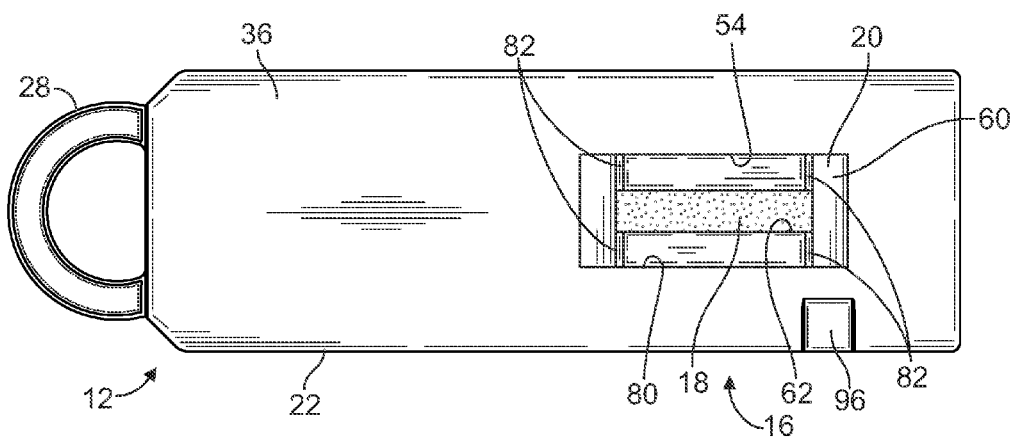
FIG. 4 is bottom plan view of the cargo restraint device of FIG. 2.
Figure 5:
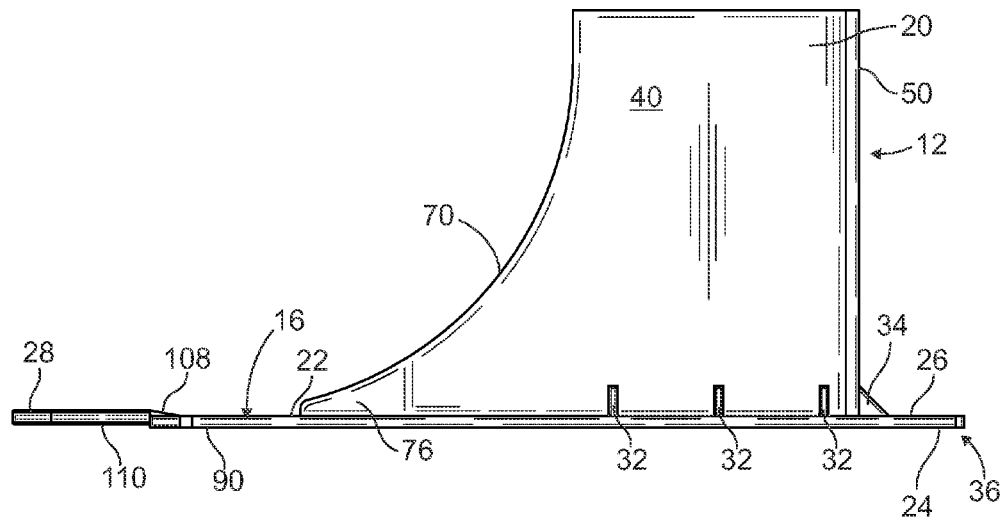
FIG. 5 is a side plan view of the cargo restraint device of FIG. 2.
Figure 6:
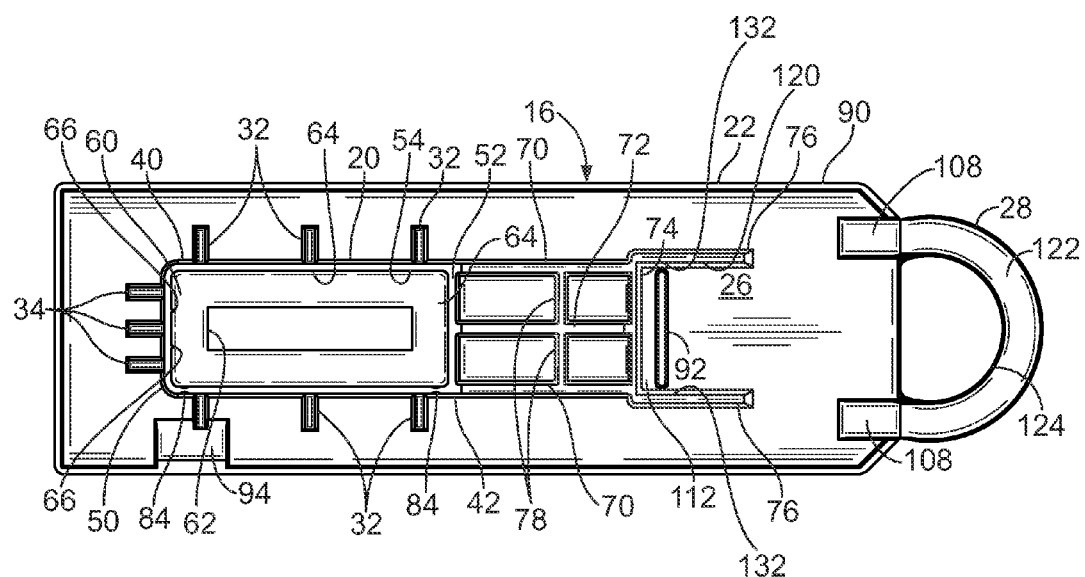
FIG. 6 is a top plan view of the sleeve member of the cargo restraint device of FIG. 2.

FIG. 1 illustrates a cargo restraint assembly 10 restraining cargo in a container in the form of a semi-trailer. The cargo restraint assembly 10 includes a pair of cargo restraint devices 12 in accordance with an illustrated embodiment of the present disclosure and an elongated support 14. The pair of cargo restraint devices 12 is secured to opposed walls of the semi-trailer and is engaged with the elongated support 14, with the elongated support extending across the bed of the semi-trailer. The cargo restraint assembly 10 in accordance with the present disclosure is used for limiting the shifting of cargo being transported by or within the semi-trailer, or by or within any other shipping vehicle or other container, such as, for example, any type of truck, railcar, ship or aircraft or other shipping vehicle.

Each cargo restraint device 12 may have any suitable construction. As illustrated in FIGS. 1-6, for example, each cargo restraint device 12 in accordance with the illustrated embodiment of the present disclosure comprises generally a sleeve member 16 and a compressible insert 18. Each sleeve member 16 includes a sleeve 20, an elongated strip 22 having a bottom strip surface 24 and a top strip surface 26, a handle 28 disposed at an end of the strip 22, and a plurality of side gussets 32 and a plurality of end gussets 34 for adding strength and rigidity to the sleeve and transferring to shear stress at least some of the tensile force applied by the elongated support 14. Each cargo restraint device 12 may be constructed of any suitable material such as any suitable plastic or other material.

Each cargo restraint device may also include an adhesive 36 disposed on the bottom surface 24 for securing the bottom surface 24 to the wall of the semi-trailer. The adhesive 36 may be in any suitable form. The adhesive 36 may, for example, be in the form of an acrylic based or rubber based adhesive. A removable release liner may also be included. After removal of the release liner, the cargo restraint device 12 can be pressed against one of the walls of the semi-trailer to secure it to the wall. The adhesive 36 may be instead disposed directly on the rear surface, may be in the form of a two-sided tape with a removable release liner, or may be in any other suitable form.

The sleeve 20 extends from the top surface 26 generally perpendicular to the strip 22. The sleeve 20 comprises a pair of opposed side walls 40 and 42 and a pair of opposed end walls 50 and 52. The walls 40, 42, 50 and 52 extend from the top surface 26 generally perpendicular to the strip 22 and define a cavity 54 sized and configured to receive the end of the elongated support 14. The sleeve 20 also includes a platform 60 extending generally parallel to the strip 22 and spaced from the strip approximately 1¼" or any other suitable distance. The platform 60 defines an aperture 62 for providing easy access to the compressible insert 18 during assembly of the cargo restraint assembly 10 and to reduce manufacturing costs. The walls 40, 42, 50 and 52 surround the platform. The walls 40, 42, 50 and 52 and the platform 60 define within the cavity 54 a cavity 64 for receiving the compressible insert 18 and the elongated support 14. The inside of the end wall 50 includes a pair of tabs 66 extending the height of the cavity 64 for engaging the compressible insert 18 to retain it within the cavity 64.

The sleeve 20 includes a pair of arcuate gussets 70 that extend from the side walls 40 and 42 of the sleeve from the end wall 52 towards the top surface 26 of the strip 22. Each arcuate gusset 70 and a respective side wall 40 and 42 are collinear. The sleeve 20 also includes an additional arcuate gusset 72 is disposed between the pair of arcuate gussets 70. The gussets 70 and 72 extend parallel to each other and terminate at a boundary or gusset wall 74. The gussets 70 and 72 add strength and rigidity to the sleeve 20 and transfer to shear stress at least some of the tensile force applied by the elongated support 14.

Figure 7:
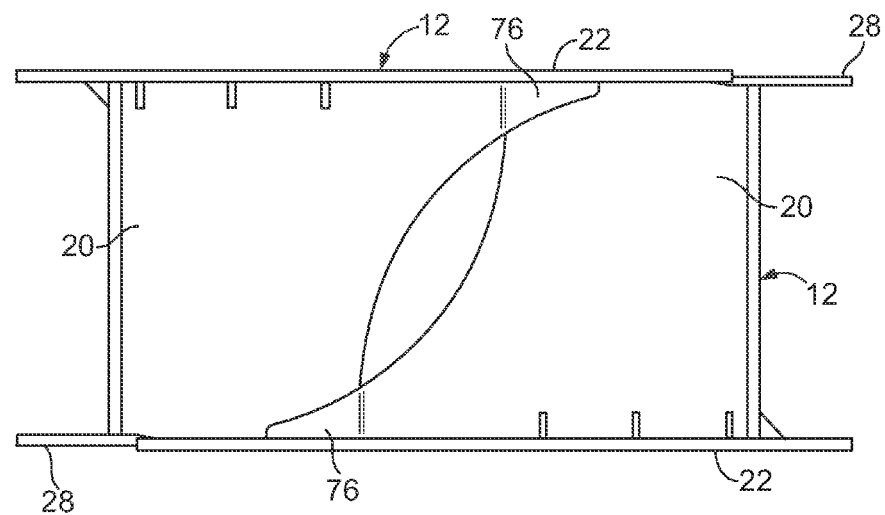
FIG. 7 is a perspective view of a pair of the cargo restraint devices of FIG. 1 stacked together.

The boundary wall 74 extends wider than the width defined by the arcuate gussets 70. A pair of front gussets 76 extend from the ends of the boundary wall 74 towards the handle 28 and parallel to the gussets 70 to provide additional rigidity and also for providing stackability of two cargo restraint devices 12 as shown in FIG. 7 and as described in more detail below. An intermediate wall 78, extending parallel to the boundary wall 74, interconnects the gussets 70 and 72.

The platform 60, the strip 22 and the walls 40, 42, 50 and 52 define a bore 80 opposite the cavity 64. The sleeve 20 also includes a plurality of internal gussets 82 extending within the bore 80 on an angle from the side walls 40 and 42 to the platform 60 to add strength and rigidity to the sleeve 20 and transfer to shear stress at least some of the tensile force applied by the elongated support 14.

The side wall 42 includes a pair of lines of reduced thickness 84 that extend generally perpendicular to the strip 22 and define a frangible portion 86. The lines 84 extend generally parallel to each other and are spaced relative to each other. The lines 84 enable the frangible portion 86 to be readily broken to facilitate removal of the cargo restraint device 12 after use. For example, a tool such as a crow bar or other tool can be inserted into the cavity 64 adjacent the elongated support 14 to break the frangible portion 86.

The strip 22 includes a rail 90 extending substantially about its perimeter also to add strength and rigidity to the strip 22 and transfer at least some of the tensile force applied by the elongated support 14 to shear stress. The strip 22 also includes a lip 92 on its top surface 26 for providing stackability of two cargo restraint devices 12 as shown in FIG. 7 and as described in more detail below.

The strip 22 also includes a raised surface 94 that defines a pry slot 96 for facilitating removal of the cargo restraint device 12. After use, any suitable tool can be inserted into the pry slot 96 and upon application of force the cargo restraint device 12 can be separated readily from the wall of the semi-trailer.

The compressible insert 18 may be constructed of any suitable material and may have any suitable configuration and dimensions. The illustrated compressible insert 18 is constructed of foam. The compressible insert 18 is sized to be received snugly within the cavity 64 and thus may have a cross section having dimensions substantially the same as the dimensions of the cross section of the elongated support 14. The sleeve 20 may include a tab adjacent the platform for engaging the insert. The compressible insert 18 may have a height of 3¾" or may have any other suitable height. The compressible insert 18 may have a generally rectangular block configuration with six flat sides. The compressible insert 18 may have any other configuration, including, for example, any other block configuration, and any other suitable dimensions in accordance with other embodiments of the present disclosure. The insert 18 may instead be constructed of a non-compressible material in accordance with other embodiments of the present disclosure.

When the compressible insert 18 is received by the cavity 64, it defines within cavity 64 a cavity 100 for receiving the end of the elongated support 14. The compressible insert 18 is scored about its perimeter to form a separable portion 98 of the compressible insert 18 that can be readily removed to reduce the height of the insert 18 and thereby increase the size of the cavity 100. Thus the intact compressible insert 18 can be used in semi-trailers or other containers with a certain internal width and the shortened compressible insert can be used in semi-trailers or other containers having a slightly smaller internal width. The insert 18 may include any other suitable structure for forming a removable portion in accordance with other embodiments of the present disclosure.

The gussets 32 and 34 may have any suitable configuration and any suitable number. The illustrated gussets 32 extend on an angle from the respective side wall 40 and 42 to the strip 22. The illustrated gussets 34 extend on an angle from the end wall 50 to the strip 22. The gussets 32 and 34 add strength and rigidity to the cargo restraint device 12 and transfer to shear stress at least some of the tensile force applied by the elongated support 14.

The handle 28 is disposed at one end of the strip 22 and is configured to facilitate manual installation and removal of the cargo restraint device 12 from the wall of the semi-trailer after use. The handle 28 has a semi-circular construction. The handle 28 is joined to the strip 22 by a pair of bosses 108 that have a sloping top surface. The handle 28 extends generally parallel to the strip 22 and the handle and strip 22 and the wall define an opening 110 to facilitate manual grasping of the cargo restraint device 12 when it is secured to a wall for installation and removal from the wall. The handle 28 is cored on its backside to define a channel 114 substantially along the arc length of the handle. The handle 28 also has a height that extends higher than the top surface of the strip for providing stackability of two cargo restraint devices 12 as shown in FIG. 7 and as described in more detail below.

The cargo restraint device 12 in accordance with the illustrated embodiment of the present disclosure provides many benefits. With its design, the cargo restraint device 12 is better able to transfer at least some of the tensile force imposed by the elongated support to shear stress and to withstand the shear stress.

The cargo restraint assembly 10 is also more effective than prior art products because it can perform well in semi-trailers or other containers of different sized internal widths. Because of the design of cargo restraint devices 12, the cargo restraint assembly 10 is better able to withstand the loads imposed by the elongated support 14 during installation and during cargo transport in trucks having different internal widths. For example, the raised platform 60 with the gussets 82 provide a structure that effectively transfers at least some of the tensile force of the elongated support 14 to shear stress and also increases the shear strength of the cargo restraint device 12. The gussets 70 and 72 also provide similar benefit.

Further, the ability to remove a portion of the compressible insert 18 to shorten its height enables the cargo restraint devices 12 to continue to be effective in transferring this tensile force to shear stress when a narrower semi-trailer is used without having to change the size of the elongated support 14. For example, in application, as relating to semi-trailers, the compressible insert 18 can have a height of about 3¾" and can have a score around some or all the perimeter half way of its height (see, e.g., FIG. 1). For semi-trailers having an internal width of about 100½" to 102", the compressible insert 18 can be used with its full height. For semi-trailers having an internal width of about 98" to 100½", a half portion of the compressible insert 18 can be removed to accommodate the greater internal width.

Accordingly, an embodiment of the present disclosure also includes a method of restraining cargo selectively in semi-trailers or other containers of different widths with an elongated support. For example, the method may include restraining cargo selectively in a first container having a first internal width or in a second container having a second internal width that is less than the first internal width. The method includes securing the cargo restraint device 12 on the wall of the selected of the first or second container, the cargo restraint device comprising the strip 22 having the bottom surface 24 having the adhesive 36 disposed therein for securing to the wall of the selected of the first or second container and the top surface 26, the sleeve 20 extending generally perpendicularly from the top surface, the sleeve having the platform 60 substantially parallel to and spaced from the strip, the platform defining a first cavity, and the compressible insert 18 having a block configuration and including a separable portion to be removed for reducing the size of the compressible insert, the compressible insert receivable in the first cavity to define within the first cavity a second cavity; removing the separable portion of the compressible insert if the selected of the first or second container is the first container; placing the compressible insert into the first cavity; and inserting the end of the elongated support 14 into the second cavity so that the end engages the compressible insert and the compressible insert engages the platform and so that the cargo restraint device transfers to shear stress at least some of the tensile force of the elongated support. The method may also include securing the other cargo restraint device on the other wall of the selected of the first or second container in a like manner. The steps of the method in accordance with the present disclosure may be performed in any order and with or without additional steps.

An embodiment of the present disclosure also includes the method of securing the cargo restraint device on one of the walls and inserting the end of the elongated support into the first cavity so that the end is spaced from said one wall and so that the cargo restraint device transfers to shear stress at least some of the tensile force of the elongated support. The method may also include inserting the insert into the second cavity before inserting the end of the elongated support into the cavity. The method may also include securing an other cargo restraint device on the other of the walls and inserting the other end of the elongated support into the open end of the cavity of the other cargo restraint device.

The cargo restraint device 12 in accordance with the illustrated embodiment of the present disclosure also provides stackability benefits for storage purposes because each cargo restraint device is invertably stackable with another cargo restraint device (see, e.g., FIG. 7). Each of the cargo restraint devices defines a holder 120 for receivingly engaging the sleeve of another cargo restraint device in a complementary manner. In the illustrated embodiment, the top surface 122 of the handle 28 is disposed above the top surface 26 of the strip 22 (relative to the bottom surface 24), and the holder 120 is defined by the inner wall 124 of the handle, the front gussets 76, the boundary wall 74 and the lip 92. The holder 120 of one cargo restraint device receives the lead end of the sleeve 20 of the other cargo restraint device, while at the same time the holder 120 of the other cargo restraint device is able to receive the lead end of the sleeve of the one cargo restraint device in the same manner. Each of the base of the boundary wall 74, the base of the front gussets 76, and the base of the inner wall 124 of the handle may have a blended radius to further define the holder 120. The lip 92 is received within the cavity 54 of the other cargo restraint device, with the lead end of the wall 52 of the cargo restraint device being received by a gap 112 defined within the holder 120 by the boundary wall 74 and the lip 92 of the other cargo restraint device and the lead ends of the walls 40 and 42 being received by gaps 132 defined within the holder 120 by the respective front gussets 76 and the ends of the lip 92.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A stackable device for engaging an elongated support for restraining cargo in a container having a pair of opposed walls and configured to transfer to shear stress at least some of the tensile force applied by the elongated support, the stackable device invertably stackable with an other stackable device, the stackable device comprising:
- a strip having a bottom strip surface with an adhesive disposed thereon for securing the stackable device to one of the walls of the container, and a top strip surface, the strip having a pair of ends;
- a sleeve including a plurality of walls extending from the top strip surface generally perpendicular to the top strip surface defining a cavity having an open end for receiving an end of the elongated support; and
- a lip on the top strip surface between one of the ends of the strip and the sleeve;
- wherein during stacking the cavity receives a lip of the other stackable device and the lip of the stackable device is configured to be received by a cavity of the other stackable device.

2. The stackable device of claim 1 further including a pair of gussets disposed about the lip, the lip and the pair of gussets defining a holder, wherein during stacking the holder engages a sleeve of the other stackable device and the sleeve of the stackable device is configured to engage a holder of the other stackable device.

3. The stackable device of claim 2 further including a handle disposed at one of the ends of the strip, the handle further defining the holder.

4. The stackable device of claim 3 wherein the handle has an inner wall further defining the holder.

5. The stackable device of claim 2 further including a handle disposed at said one of the ends, the handle defining a holder, wherein during stacking the holder engages a sleeve of the other stackable device and the sleeve of the stackable device is configured to engage by a holder of the other stackable device.

6. The stackable device of claim 5 wherein the handle has a top handle surface and wherein, when the stackable device is secured to said one of the walls of the container, the top handle surface and the top strip surface are generally parallel to said one of the walls and a distance from said one of the walls of the container to the top handle surface is greater than a distance from said one of the walls of the container to the top strip surface.

7. The stackable device of claim 2 further including:
- a plurality of other gussets extending from the sleeve toward said one of the ends of the strip and being generally parallel to each other; and
- a gusset wall extending generally perpendicular to the other gussets, the gusset wall positioned between the sleeve and said one of the ends, the other gussets terminating in the gusset wall, the gusset wall further defining the holder;
- wherein the plurality of gussets extend from the gusset wall toward said one end of the strip.

8. The device of claim 7 wherein the gussets are generally parallel to each other.

9. The device of claim 8 wherein the other gussets define a distance therebetween, the gusset wall having a length greater than the distance between the other gussets.

10. The device of claim 9 wherein the second gussets define a distance therebetween, the distance between the second gussets being greater than the distance between the first gussets.

11. The device of claim 10 wherein the lip and the gusset wall define a first gap within the holder and wherein during stacking the first gap receives one of the walls of the sleeve of other stackable device.

12. The device of claim 11 wherein the lip and the gussets define second gaps within the holder and wherein during stacking each second gap receives a respective one of the other walls of the sleeve of the other stackable device.

13. A stackable device for engaging an elongated support for restraining cargo in a container having a pair of opposed walls and configured to transfer to shear stress at least some of the tensile force applied by the elongated support, the stackable device stackable with an other stackable device when the stackable devices are inverted relative to each other, the stackable device comprising:
- a strip having a bottom strip surface with an adhesive disposed thereon for securing the stackable device to one of the walls of the container, and a top strip surface, the strip having a pair of ends;
- a sleeve including four walls extending from the top strip surface generally perpendicular to the top strip surface defining a first cavity having an open end for receiving the elongated support;
- a lip on the top strip surface between one of the ends of the strip and the sleeve; and
- a pair of gussets disposed about the lip, the lip, the top strip surface and the pair of gussets define a holder;
- wherein during stacking the holder engages a sleeve of the other stackable device and the sleeve of the stackable device is configured to engage a holder of the other stackable device.

14. The stackable device of claim 13 further including:
- a plurality of other gussets extending from the sleeve toward said one of the ends of the strip and being generally parallel to each other; and
- a gusset wall extending generally perpendicular to the other gussets, the gusset wall positioned between the sleeve and said one of the ends, the other gussets terminating in the gusset wall, the gusset wall further defining the holder;
- wherein the plurality of gussets extend from the gusset wall toward said one end of the strip.

15. The device of claim 14 wherein the gussets are generally parallel to each other, and wherein the other gussets define a distance therebetween, the gusset wall having a length greater than the distance between the other gussets.

16. The device of claim 15 wherein the gussets define a distance therebetween, the distance between the gussets being greater than the distance between the other gussets.

17. The device of claim 16 wherein the lip and the gusset wall define a first gap within the holder and wherein during stacking the first gap receives one of the walls of the sleeve of the other stackable device.

18. The device of claim 17 wherein the lip and the gussets define second gaps within the holder and wherein during stacking each second gap receives a respective one of the other walls of the sleeve of the other stackable device.

* * * * *